Dec. 20, 1927.
W. H. CARMAN ET AL
1,653,339
LOCKING DEVICE
Filed April 5, 1927
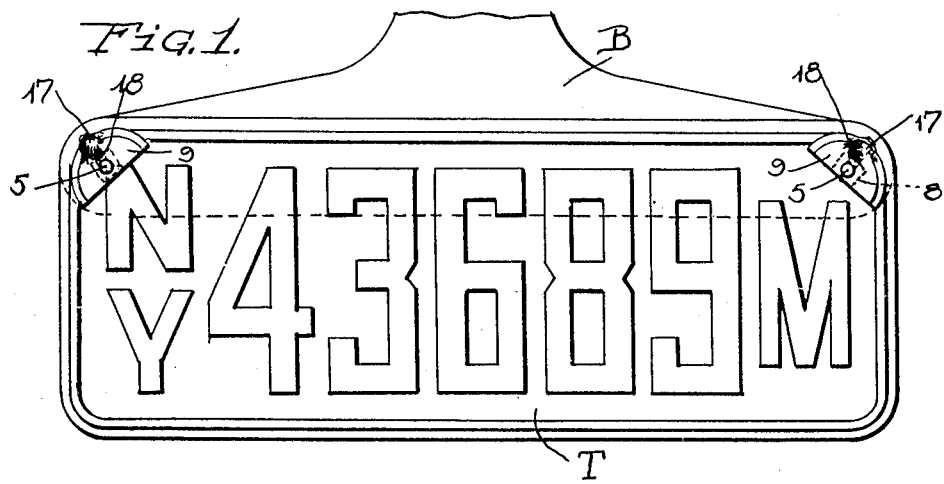
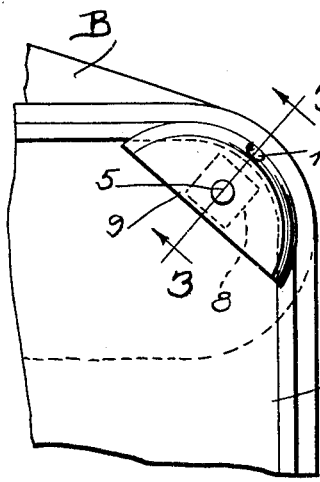
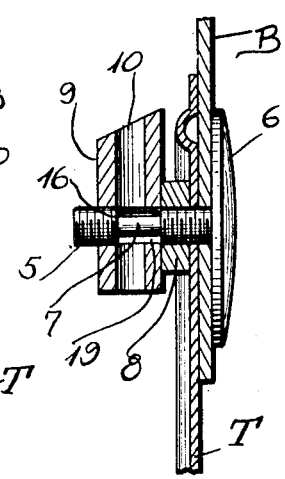
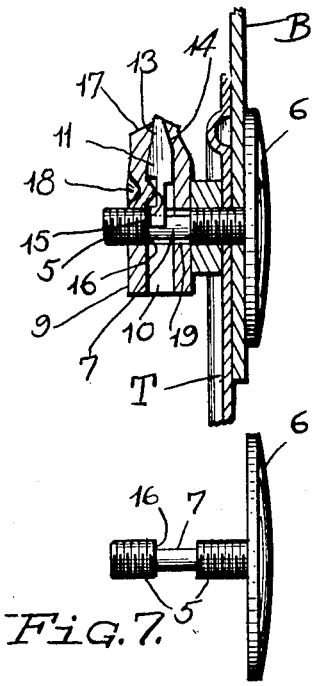
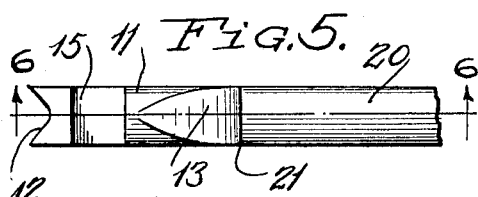
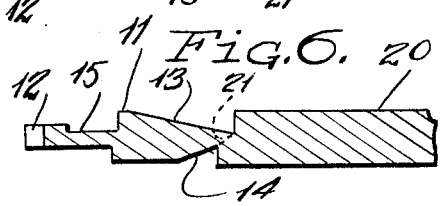
INVENTOR.
William H. Carman
BY Vivian K. Davison.
Bryant & Lowry
ATTORNEY.

Patented Dec. 20, 1927.

1,653,339

UNITED STATES PATENT OFFICE.

WILLIAM H. CARMAN AND VIVIAN K. DAVISON, OF SACRAMENTO, CALIFORNIA.

LOCKING DEVICE.

Application filed April 5, 1927. Serial No. 181,132.

This invention relates generally to locking devices, and has more particular reference to improved means for securing a plurality of members together and locking them in secured relation.

A further object is to provide a device of the above kind wherein the locking action is obtained by a sealing operation so as to reveal any surreptitious tampering with the device when in use.

The present invention, although capable of various general uses, is particularly designed as a fastener for bolting an automobile license tag upon a mounting bracket and securely locking said tag in its bolted condition whereby theft of the auto tag is discouraged.

Other objects will appear as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views, Figure 1 is an elevational view showing an automobile license tag secured and locked to a mounting bracket by means of a pair of locking devices constructed in accordance with the present invention;

Figure 2 is an enlarged fragmentary detail view showing a corner portion of the tag and the associated fastener plate, of the device shown in Figure 1, before being locked;

Figure 3 is a section taken upon line 3—3 of Figure 2 of the locking plate prior to insertion of the locking key and fastening of the latter in place;

Figure 4 is a view similar to Figure 3 with the locking key in place and fastened;

Figure 5 is a top plan view of a rod having an end formed to provide a key of the form shown in Figure 4;

Figure 6 is a longitudinal section upon line 6—6 of Figure 5; and

Figure 7 is an elevational view of the bolt forming part of the present locking device or fastener.

Referring more in detail to the drawing, the present locking device comprises a bolt having a threaded stem 5 and preferably a relatively large flat-like head 6, the stem being materially reduced in diameter intermediate its ends as at 7. As shown in Figures 3 and 4, the stem 5 of the bolt is adapted to be passed through aligned openings of the members to be fastened together, such as the mounting bracket B and the automobile license tag T, and a suitable nut 8 is provided for being threaded upon the stem 5 of the bolt inwardly of the reduced portion 7 of said bolt stem, whereby the members B and T are firmly clamped between the nut 8 and the head 6 of the bolt. This leaves the reduced portion 7 and the outer threaded portion of the bolt stem 5 projecting beyond the nut 8, and adapted for reception upon these projecting portions of the bolt stem is an apertured plate 9 of soft malleable metal, such as lead or a lead alloy, the aperture of the plate 9 being of substantially the same diameter as the larger threaded portions of the bolt stem as shown in Figures 3 and 4. The locking plate 5 is formed with a further transverse opening 10 intersecting and extending at right angles to the bolt stem receiving aperture so as to register with the reduced portion 7 of the bolt stem when in place against the outer face of the nut 8. Adapted for reception in the transverse opening 10 of the locking plate 9 is a locking key 11 having a notched or bifurcated inner end as at 12 adapted to partially embrace the reduced portion of the bolt stem when fully inserted in the opening 10 so that, if retained in place, removal of the plate 9 from the bolt stem will be prevented and threading of the nut 8 off of the bolt stem also prevented so that surreptitious removal of the tag T from the bracket B will be discouraged. The locking key 11 is retained in place by distortion of the malleable locking plate 9 as shown in Figure 4, the outer end of the key being reduced in thickness upon opposite sides as at 13 and 14 for this purpose. Also, the inner end portion of the key 11 is provided at one side with a transverse groove 15 into which a portion of the material of the plate 9 outwardly of the opening 10 may be forced by the use of a sealing die or the like. When this is done, the key 11 will be effectively locked within the opening 10 so as to engage the reduced portion 7 behind the shoulder 16 defined at the outer end of the latter so that the removal of the locking plate 9 is prevented. While the material of the locking plate 9 has been disclosed at 17 as pressed together at opposite sides of the opening 10 against corresponding sides of the reduced outer end of the locking key 11 in Figure 4, it is obvious that this may be omitted and only depression of material into the groove 15 resorted to as at 18. The opening 10 is merely formed entirely through the plate 9 to facilitate production, it being only essential, as far as the use of the device is concerned to extend the opening from one edge of the plate 9 to the bolt stem receiving aperture of the latter, which latter aperture is indicated at 19.

In practice, the key 11 may be formed as an integral end portion of a rod 20 of suitable metal, the reduction of the key upon opposite sides at 13 and 14 forming a weakened connection as at 21 between the outer end of the key and the adjacent portion of the rod 20. Thus, the rod 20 may be employed as a handle to insert the key in the opening 10, whereupon said rod may be bent so as to cause the key 11 to break off from the same at the weakened line 21.

In using the device in connection with automobile tags, one device will be employed at each upper corner of the tag and the associated end of the mounting bracket as disclosed in Figure 1, so that the tag will be properly secured in position.

A locking device constructed as described above is simple, and inexpensive in construction and may be readily applied to form an efficient sealed locking device for the intended purposes.

Minor changes may be made without departing from the spirit and scope of the invention as claimed.

What we claim as new is:—

1. In a locking device of the character described, a bolt having a threaded stem reduced in diameter between its ends, a nut adapted to be threaded onto the stem to a position inwardly of the intermediate reduced portion thereof, a locking plate of soft malleable metal having an aperture to receive the bolt stem and adapted to be disposed on the latter at the outer side of the nut, said locking plate having a transverse opening intersecting the aperture thereof, and a key in said opening engaged at its inner end with the reduced portion of the bolt stem and adapted to be retained in place by distortion of the locking plate thereagainst.

2. In a locking device of the character described, a bolt having a threaded stem reduced in diameter between its ends, a nut adapted to be threaded onto the stem to a position inwardly of the intermediate reduced portion thereof, a locking plate of soft malleable metal having an aperture to receive the bolt stem and adapted to be disposed on the latter at the outer side of the nut, said locking plate having a transverse opening intersecting the aperture thereof, and a key in said opening engaged at its inner end with the reduced portion of the bolt stem and adapted to be retained in place by distortion of the locking plate thereagainst, said key having a bifurcated inner end to partly embrace the reduced portion of said bolt stem.

3. In a locking device of the character described, a bolt having a threaded stem reduced in diameter between its ends, a nut adapted to be threaded onto the stem to a position inwardly of the intermediate reduced portion thereof, a locking plate of soft malleable metal having an aperture to receive the bolt stem and adapted to be disposed on the latter at the outer side of the nut, said locking plate having a transverse opening intersecting the aperture thereof, and a key in said opening engaged at its inner end with the reduced portion of the bolt stem and adapted to be retained in place by distortion of the locking plate thereagainst, said key having a transverse groove into which a portion of the locking plate may be pressed when distorted.

4. A locking device including a bolt having a stem reduced in diameter between its ends and threaded inwardly of the reduced portion to threadedly receive a nut, a locking plate adapted to be placed on the bolt stem outwardly of the nut and having a transverse bore to register with the reduced portion of the bolt stem, and a key in said bore having a notched inner end engaging the reduced portion of the bolt stem, said locking plate being formed of soft malleable metal to facilitate distortion thereof to secure the key in place.

5. A locking device including a bolt having a stem reduced in diameter between its ends and threaded inwardly of the reduced portion to threadedly receive a nut, a locking plate adapted to be placed on the bolt stem outwardly of the nut and having a transverse bore to register with the reduced portion of the bolt stem, a key in said bore having a notched inner end engaging the reduced portion of the bolt stem, said locking plate being formed of soft malleable metal to facilitate distortion thereof to secure the key in place, and said key having a portion reduced in thickness whereby its removal is prevented when the material of the locking plate is pressed thereagainst by such distortion.

In testimony whereof we affix our signatures.

WILLIAM H. CARMAN.
VIVIAN K. DAVISON.